United States Patent
Berger et al.

(10) Patent No.: US 12,038,497 B1
(45) Date of Patent: Jul. 16, 2024

(54) REFLECTOR INSTALLATIONS FOR RADAR-BASED NAVIGATION

(71) Applicant: Wisk Aero LLC, Mountain View, CA (US)

(72) Inventors: Adam Berger, Mountain View, CA (US); Andy Smith, Mountain View, CA (US); Sumant Sharma, Mountain View, CA (US); Geoffrey Alan Long, Montara, CA (US)

(73) Assignee: Wisk Aero LLC, Mountain View, CA (US)

( * ) Notice: Subject to any disclaimer, the term of this patent is extended or adjusted under 35 U.S.C. 154(b) by 334 days.

(21) Appl. No.: 17/531,057

(22) Filed: Nov. 19, 2021

Related U.S. Application Data (60) Provisional application No. 63/116,121, filed on Nov. 19, 2020.

(51) Int. Cl.
*G01S 13/87* (2006.01)
*G01S 13/91* (2006.01)
*H01Q 3/08* (2006.01)

(52) U.S. Cl.
CPC .......... *G01S 13/876* (2013.01); *G01S 13/913* (2013.01); *H01Q 3/08* (2013.01)

(58) Field of Classification Search
CPC ........ G01S 13/876; G01S 13/913; H01Q 3/08
See application file for complete search history.

(56) References Cited

U.S. PATENT DOCUMENTS

| 2,697,828 | A | * | 12/1954 | Heintz | H01Q 1/1228 342/7 |
| 5,483,241 | A | * | 1/1996 | Waineo | G01S 13/913 342/36 |
| 2010/0011868 | A1 | * | 1/2010 | Cox | G01P 3/44 73/660 |
| 2012/0242351 | A1 | * | 9/2012 | Hochreutiner | G01S 13/58 324/642 |
| 2016/0261033 | A1 | * | 9/2016 | Park | G01S 1/02 |
| 2023/0132260 | A1 | * | 4/2023 | Schmid | G01S 13/767 701/117 |

* cited by examiner

*Primary Examiner* — Bernarr E Gregory
*Assistant Examiner* — Juliana Cross
(74) *Attorney, Agent, or Firm* — Kilpatrick Townsend & Stockton LLP (57) ABSTRACT

Embodiments provide a landing and approach navigation system. The navigation system can use a radar system onboard an aircraft to transmit radio energy. A rotating reflector at a landing area can reflect the radio energy back to the radar system with an amplitude-modulation that is due to the rotation. With synchronized timing between the reflector and the radar system, and known rotation characteristics of the reflector, the radar system can use the reflected radio energy to calculate the bearing of the aircraft relative to the reflector and landing area.

20 Claims, 8 Drawing Sheets

REFLECTOR INSTALLATIONS FOR RADAR-BASED NAVIGATION

RELATED APPLICATIONS

This application claims benefit under 35 USC § 119(e) to U.S. Provisional Patent Application No. 63/116,121 filed Nov. 19, 2020 and entitled "Ground Installation For Accurate Terminal Guidance," the disclosure of which is incorporated by reference herein in their entirety for all purposes.

BACKGROUND OF THE INVENTION

Operators of aircraft that perform vertical take-off and/or landing operations often desire to operate from selected landing surfaces not much larger than the aircraft itself. This may require high positioning accuracy, with errors below ten meters. The desired positioning accuracy increases with decreasing above-ground aircraft height.

The global positioning system (GPS) provides timing information and positioning information to an aircraft around the world. However, GPS positioning error can exceed tens of meters. This makes GPS unsuitable for terminal operations on small landing surfaces and small take-off surfaces.

Additionally, GPS positioning can be lost due to receiver failure or disruption of the GPS signal in space. When GPS positioning is lost, an aircraft may fall back to a secondary positioning system. Such systems (e.g. inertial navigation) typically have positioning accuracy significantly worse than that of GPS.

SUMMARY

Described herein are examples (or embodiments) of an approach and landing navigation system. The navigation system can use a radio-frequency transmitter onboard an aircraft to transmit radio waves. Rotating reflectors at landing areas (e.g., airports) can reflect radio energy back to a radio-frequency receiver. With synchronized timing and known rotation characteristics of the reflectors, onboard processors can use the reflected radio energy signals to calculate the bearing of the aircraft relative to the landing areas.

Embodiments provide a radar-based navigation system that is more accurate than GPS and sufficiently accurate for landing on small surfaces (e.g., sub-meter accuracy). In addition, the radar-based navigation system described herein is more reliable than GPS, which may not always be available near landing areas.

Additionally, embodiments provide an efficient and non-intrusive navigation solution. For example, existing radar altimeter equipment already present in aircraft can be utilized for this additional function, such that additional equipment need not be added. Also, one or more relatively small and non-intrusive reflectors can be installed at airports, as opposed to more complex Very High Frequency Omni-Directional Range (VOR) systems. Further, existing GPS timing signals can be used to synchronize the reflectors and the onboard processors without having to establish a new synchronization system.

According to various embodiments, a system is provided that comprises an aircraft and navigation equipment coupled to an aircraft. The navigation equipment includes an antenna assembly configured to transmit radio energy and detect radio energy and one or more processors. The one or more processors are configured to receive, from the antenna assembly, a reflected radio energy signal that was reflected by a reflector and detected by the antenna assembly, wherein the reflected radio energy signal is amplitude-modulated due to the reflector rotating at a predetermined rotational rate. The one or more processors are also configured to determine an amplitude-modulation frequency of the reflected radio energy signal, the amplitude-modulation frequency corresponding to the predetermined rotational rate. The one or more processors are also configured to identify, based on the amplitude-modulation frequency, a reflector record associated with the reflector from among a plurality of reflector records corresponding to a plurality of reflectors, the reflector record including information about a predetermined location of the reflector. The one or more processors are further configured to navigate using the predetermined location.

Embodiments further provide a method comprising transmitting, by an aircraft, radio energy, and receiving a reflected radio energy signal that was reflected by a reflector. The reflected radio energy signal is amplitude-modulated due to the reflector rotating at a predetermined rotational rate. The method further includes determining an amplitude-modulation frequency of the reflected radio energy signal, the amplitude-modulation frequency corresponding to the predetermined rotational rate. The method also comprises identifying, based on the amplitude-modulation frequency, a reflector record associated with the reflector from among a plurality of reflector records corresponding to a plurality of reflectors. The reflector record includes information about a predetermined location of the reflector. The method further includes navigating using the predetermined location.

BRIEF DESCRIPTION OF THE DRAWINGS

Various embodiments of the invention are disclosed in the following detailed description and the accompanying drawings.

DETAILED DESCRIPTION

Embodiments may be implemented in numerous ways, including as a process; an apparatus; and/or a system. In this specification, these implementations, or any other form that embodiments may take, may be referred to as techniques. In general, the order of the steps of disclosed processes may be altered within the scope of the invention. Unless stated otherwise, a component may be implemented as a general component that is temporarily configured to perform the task at a given time or a specific component that is manufactured to perform the task.

Various embodiments provide a navigation system. The navigation system can include a radar system onboard an aircraft that transmits radio energy. Reflectors (e.g. rotating reflectors) at a landing area (e.g. an airport) can reflect the radio energy received from the aircraft, and the reflected radio energy can be detected by the radar system. With synchronized timing between the reflectors and an onboard computer at the aircraft, and with known characteristics (e.g. rotation characteristics) of the reflectors, the onboard computer can use the detected radio energy reflections to calculate the bearing of the aircraft relative to the reflectors and the landing area. More specifically, the variation of the reflected radio energy over time can be used to calculate the bearing of the aircraft.

Accordingly, embodiments provide a navigation system that is more accurate than GPS and sufficiently accurate for landing on surfaces of a predetermined size (e.g. small surfaces) that require sub-meter accuracy. Also, the navigation system is more reliable than GPS, which may not always be available near landing areas.

Additionally, embodiments provide an efficient and non-intrusive navigation solution. For example, existing radio altimeter equipment already present in aircraft can be utilized for this additional function, such that additional equipment need not be added. Also, one or more relatively small and non-intrusive reflectors can be installed at airports, as opposed to more complex VOR systems. Further, existing GPS timing signals can be used to synchronize the reflectors and the onboard processors without having to establish a new synchronization system.

Figure 1A:
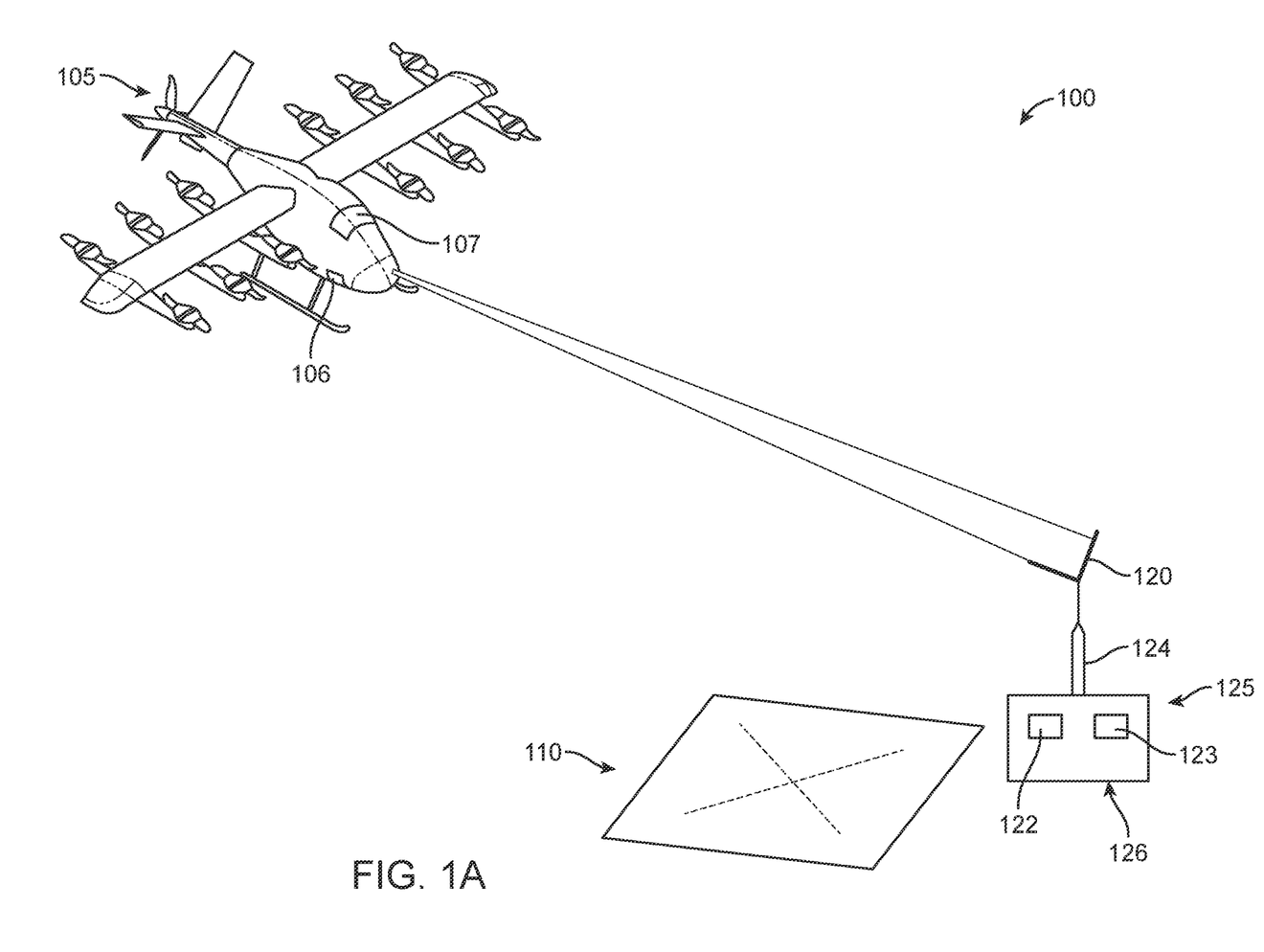
FIGS. 1A-1B illustrate an example of a navigation system, according to various embodiments.
Figure 1B:
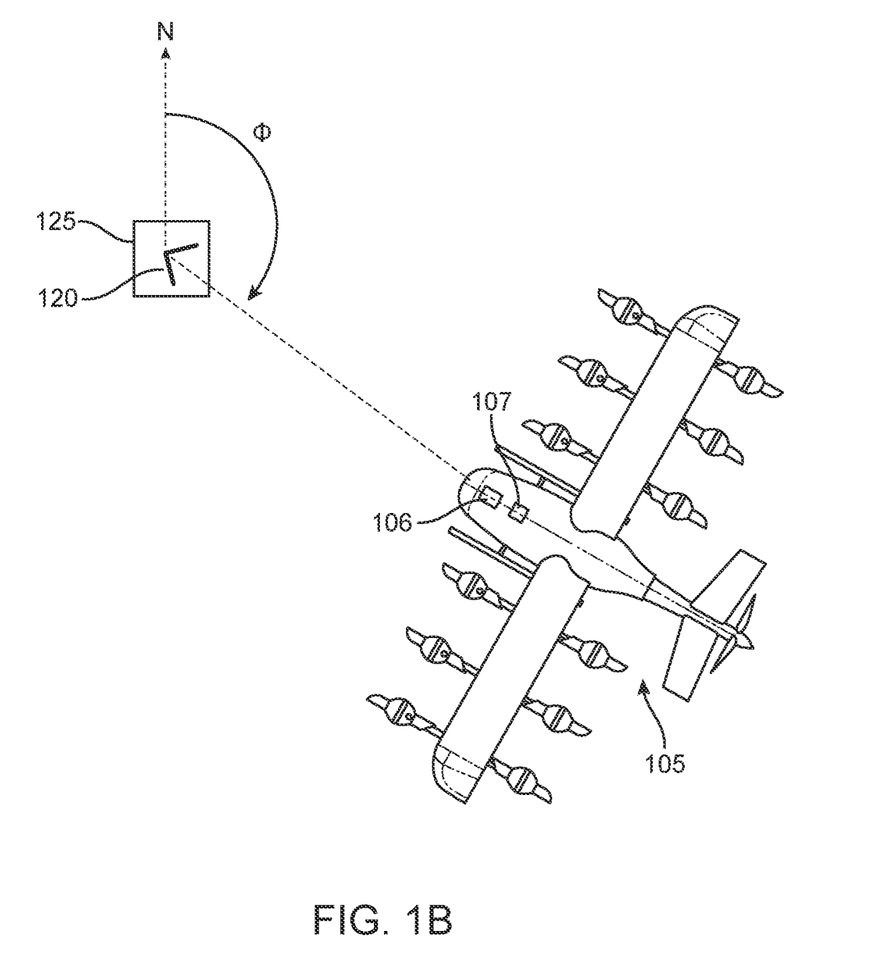

FIGS. 1A-1B illustrate an example of a navigation system 100. The navigation system 100 can include a landing area 110 where an aircraft 106 can land (also referred to as an aircraft landing area). The navigation system 110 further includes at least one reflector 120 that is located at a predetermined location. The predetermined location can include the landing area 110, a space adjacent to the landing area 110, or a space other otherwise near (e.g. within a predetermined distance of) the landing area 110. The aircraft 106 shown in FIG. 1 may be approaching or otherwise flying within radar-range of the landing area 110. The aircraft 105 can include navigation equipment such as a radar system 106. Radio energy emitted by the radar system 106 can be reflected by the reflector 120, and the reflected radio energy can be received back at the radar system 106. Further, the reflector 120 can be configured to rotate in a predetermined manner that is known by the aircraft 105. The reflector 120 may reflect radio energy back to the aircraft 105 when the reflector 120 is oriented toward the aircraft 105. As a result, the aircraft 105 can use the reflected radio energy along with known information about the reflector's orientation at the time the signal was reflected to determine an angle from the aircraft 105 to the reflector 120 and the landing area 110, such as a bearing 130. The aircraft 105 can use this bearing 130 information to assist in landing at the landing area 110.

Radar System Onboard Aircraft

According to various embodiments, the aircraft 105 can be any suitable type of flying vehicle, such as an airplane, a helicopter, or a hybrid-type flying vehicle. The aircraft 105 can be configured for human piloting and/or automated flight. The aircraft 105 can include internal space for cargo, seats or other areas for passengers, and/or any other suitable internal configuration. In some embodiments, the aircraft 105 may be an electric aircraft capable of vertical take-off and landing (VTOL).

The aircraft 105 can include one or more computers 107. The computer 107 (which can include a processor) can be used for a variety of applications, such as flight control system operation, navigation, external communication, etc. The computer 107 may interface with and/or control other instruments on the aircraft 105, such as a radar system 106. The computer 107 can be considered a form of navigation equipment.

The aircraft 105 can include additional navigation equipment, such as one or more navigational instruments. For example, the aircraft 105 can include a radar system 106. The radar system 106 can include both a radio-frequency transmitter and a radio-frequency receiver. Together, these can form a radio-frequency transceiver configured to both emit and detect electromagnetic radiation in the radio-frequency spectrum.

Figure 1C:
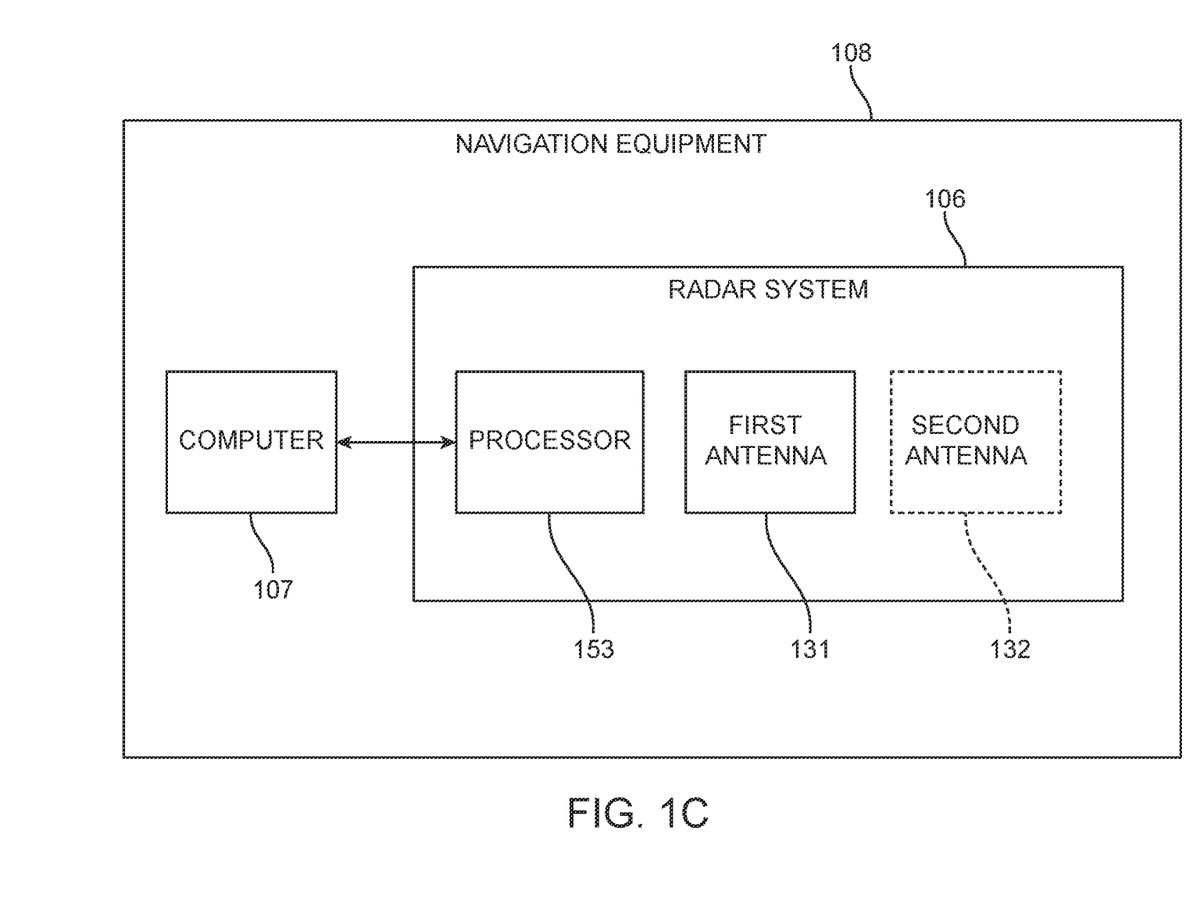
FIG. 1C illustrates an example of a navigation equipment, according to various embodiments.

An example of navigation equipment on an aircraft is shown in FIG. 1C. As mentioned above, navigation equipment 108 can include an aircraft computer 107, which can comprise a flight control system. Also, navigation equipment 108 can include a radar system 106. The radar system 106 may include an antenna assembly. The antenna assembly can include one antenna, two antennae, or any other suitable number of antennae for transmitting radio energy and/or detecting radio energy (i.e., electromagnetic radiation in the radio-frequency spectrum). In some embodiments, a single antenna (e.g., a first antenna 131) can perform both transmitting and receiving functions. In other embodiments, separate antennae (e.g., two antennae) can be used for transmitting and receiving. For example, the first antenna 131 can be used for transmitting radio energy, and a second antenna 132 can be used for receiving radio energy. In the case of multiple antennae, the antennae can be located in an suitable position on the aircraft 105. For example, the first antenna 131 may be positioned in a first position on the aircraft 105 (e.g., on the top of the aircraft), and the second antenna 132 may be positioned in a second position on the aircraft 105 (e.g., on the bottom of the aircraft).

Electromagnetic radiation in the radio-frequency spectrum will be primarily referred to as radio energy. However, radio energy also be referred to as radio waves, radio frequency, etc. Also, while the description will primarily discuss using RADAR (radio detection and ranging), embodiments allow the aircraft 105 to use any suitable equipment for transmitting and receiving electromagnetic radiation of any suitable frequencies.

In some embodiments, the radar system 106 may use a frequency-modulated signal that changes in frequency (also referred to as energy) over time. For example, the radar system 106 may emit radio energy that ramps up and down between two frequency limits, Fmin and Fmax (e.g., 4.1 GHz and 4.3 GHz), over a given time, T. The speed (or frequency) at which the radio energy ramps up and down can be referred to as frequency-modulation speed or frequency-modulation frequency.

The radar system 106 may transmit radio energy continuously or periodically, according to embodiments. The radar system 106 may transmit radio energy in one direction at a time and alternate or sweep across a range of directions. Alternatively, the radar system 106 may transmit radio energy toward a range of multiple directions simultaneously.

The radar system 106 may also include a processor 153. The processor 153 can include a programmable computer processor, signal-processing electronics, and/or any other suitable computer components and signal processing components. The processor 153 may be configured to analyze received radio energy, compare received radio energy with transmitted radio energy, and/or otherwise extract information from received radio energy. For example, the processor 153 can determine a time delay and/or frequency difference of received radio energy as compared to transmitted radio energy to determine a distance from the aircraft 105 to an object that reflected the radio energy. In some embodiments, the processor 153 can also identify and/or extract modulated signals from the received radio energy.

In some embodiments, the radar system 106 can be used for altimetry. In this case, the radar system 106 can take the form of radio altimetry (also known as radar altimetry) equipment. The radar system 106 may emit radio energy downward from the aircraft 105 (e.g., toward the ground), and then detect some of the radio energy after the radio energy is reflected upward by the ground. By analyzing a difference between the emitted and detected radio energy, the radar system 106 can measure and determine the aircraft's current height above the ground/terrain. In some situations, the ground underneath the aircraft 105 may not be at sea level, and therefore the measured height distance may not represent the aircraft's altitude above sea level, but may instead measure altitude relative to the surface below.

Embodiments allow the radar system 106 to use any suitable characteristics or features of radio energy when determining distance (e.g., to the ground or other distant objects). For example, the radar system 106 can measure a time delay (or time of flight) between a radio energy emission pulse and detected radio energy pulse. The time delay can be multiplied by the speed of light to determine a distance between the aircraft 105 and the radio energy reflecting object. As another example, the radar system 106 can emit a frequency-modulated signal. Since the signal takes a finite time to travel to and from the reflecting object, the detected signal will have a different frequency than what the transmitter is broadcasting at the time the reflected signal arrives back at the radar system 106. The radar system 106 can determine a difference in frequencies between the current emitted radio energy signal and the detected radio energy signal. Information about the speed of frequency-modulation (also referred to as frequency-modulation frequency) can be used to determine the time delay between signal emission and detection, and the time delay (or time-of-flight) can be used to determine the distance. Any other suitable radar techniques can be utilized, according to embodiments.

Embodiments of the invention can advantageously utilize the radar system 106 for additional applications. Specifically, in some embodiments, the radar system 106 can be used to identify a specific reflector 120 from among a plurality of reflectors, and/or used to measure the bearing 130 of the aircraft 105 relative to a reflector 120. Such additional applications can occur simultaneously with the altitude-measuring application (e.g., radar altimetry). According to various embodiments, one or more reflectors 120 located at or around (e.g. near) a landing area 110 can be configured to reflect radio energy transmitted by the radar system 106. The reflectors 120 can reflect the radio energy in a recognizable manner or pattern. The reflected radio energy can then be detected by the radar system 106 and identified by the radar system 106 (and/or a separate computer 107) as being reflected by a certain reflector 120 (e.g., based on a reflection pattern or modulation). This information can then be used by the radar system 106 (and/or a separate computer 107) to determine the bearing 130 of the aircraft 105 relative to a landing area 110.

Reflectors at Landing Area

Referring back to FIG. 1, the landing area 110 can be a location or surface where the aircraft can land, such as a runway, a pad, a cart, or any other suitable surface or aircraft-supporting apparatus. In some embodiments, the landing area 110 can be located at an airport. An airport that is configured for VTOL aircraft can be referred to as a vertiport.

The reflector 120 can be associated with the landing area 110. Embodiments allow the reflectors 120 to be positioned on the landing area 110 (e.g., in the center of the landing area or on a side of the landing area), adjacent to the landing area 110, or otherwise near the landing area 110. For illustrative purposes, one reflector 120 is shown in FIGS. 1A-1B. However, additional reflectors can be included in a same or nearby area (e.g., at the same landing area or airport).

According to embodiments, the reflector 120 may be part of a ground installation 125. The ground installation 125 can include the reflector 120, a motor 122 which may be coupled to the reflector 120, a control system 123, a support structure 124, and/or a housing 126. The housing 126 may house the motor 122, the control system 123, and/or any other suitable components. The support structure 124 may include a support beam, a platform, an arm, a tower, and/or any other suitable components for supporting the reflector 120. The control system 123 may control the operation of the motor 122 and/or the rotation of the reflectors 120. The control system 123 may also maintain a timing signal, such as a pulse-per-second signal. The control system 123 can include a processor, and can be in communication with and/or incorporate a GPS receiver and/or any suitable communication equipment.

The ground installation 125 can also include a power source and any other suitable electronics. The ground installation 125 can be powered either from a power source remote to the installation, or from a local power source (e.g. a solar panel, rechargeable and/or replaceable battery). The ground installation 125 may be configured to use a steady-state power draw that is low enough to be powered by a small solar panel.

The reflector 120 can include any suitable reflective apparatus. According to embodiments, the reflector 120 may be a retroreflector. A retroreflector includes devices or surfaces that reflect radiation back to the radiation source with minimum scattering and dispersion. A retroreflector can reflect radio energy back to the source at a wide range of angles of incidence (unlike a planar mirror, which only reflects back to the source when there is a zero angle of incidence). A retroreflector can direct a larger amount of the radio energy back to the source, thereby providing a stronger reflected signal. In some embodiments, the reflector 120 may take the form of a single reflector, or an array of co-aligned reflectors.

According to some embodiments, the reflector 120 may include a trihedral corner reflector. A trihedral corner reflector can be a passive device that includes three flat, intersecting, conductive surfaces mounted mutually perpendicular to each other. Each surface can have any suitable shape, such as a square shape or a triangle shape. A trihedral corner reflector can be highly reflective and directionally reflective to radio waves. A trihedral corner reflector with surface sides large relative to the radio signal wavelength (e.g., larger than multiple wavelengths) is maximally reflective at a specific angle (e.g., the boresight angle). As examples, the surface sides can have a length of 5 cm, 10 cm, 20 cm, 30 cm, 50 cm, 100 cm, 150 cm, 200 cm, 1 meter, or any other suitable length that is larger than the electromagnetic radiation wavelength being reflected. In some embodiments, surface sides can have lengths within the range of 10 cm to 100 cm. Additionally, at angles within roughly 40 degrees of the boresight angle, a trihedral corner reflector is substantially more reflective than other types of targets. At angles beyond 40 degrees from the boresight angle, a trihedral corner reflector may not be substantially more reflective than other targets.

As shown in FIG. 1B, the reflector 120 can be configured to rotate. For example, the reflector 120 can be mounted on support structure 124 that is configured to spin (e.g., a spinning platform, spinning shaft, rotating arm or other rotating apparatus). The motor 122 (which may be an electric motor) can be configured to provide rotational force, and thereby configured to cause the reflector 120 to rotate. A coupling between the reflector 120 and the motor 122 can be direct (e.g. the reflector 120 is mounted on the motor 122 drive shaft) or indirect (e.g. a belt couples the reflector 120 and the motor 122). The construction of the reflector 120 may intentionally include additional mass to increase the rotational inertia around the rotational axis, and/or the motor 122 may include a flywheel, to decrease the high-frequency response of the reflector 120 to motor 122 actuation.

According to embodiments, the reflector 120 may rotate about the vertical axis or z-axis (e.g., the plumb line that intersects the zenith). As a result, the reflector 120 is dynamically oriented toward changing longitude/latitude directions (e.g., a changing azimuth area) as it rotates. Embodiments allow the reflector 120 to be aimed parallel to the ground, or alternatively inclined toward the sky at any suitable angle (e.g., which may be a fixed angle), while the reflector 120 rotates about the vertical axis. In some embodiments, it may be desirable to incline the reflector 120 so that the angle of maximum reflection (e.g., the boresight angle) is within 40 degrees of the zenith or plumb line.

In some embodiments, the reflector 120 can rotate about a different suitable axis other than the vertical axis. This can include a horizontal axis, or any suitable axis angled between vertical and horizontal.

According to embodiments, the reflector 120 can be configured to rotate at specific, predetermined rotational rate. Any suitable rotational rate can be used. For example, in some embodiments, the reflector 120 can rotate at a rate of 1, 2, 3, 4, 5, 10, 20, or 30 revolutions per second. The rotational rate may remain constant. Additionally, the reflector 120 may rotate in a certain predefined direction, such as clockwise as viewed from above.

The specific rotational rate can be an identifiable characteristic of the reflector 120. For example, other reflectors may also have specific, known rotational rates that are different. In some embodiments, a certain predefined rotational rate can be associated with a single reflector 120 and/or a group of reflectors. Further, a certain predefined rotational rate can be associated with a specific landing area 110, a specific airport or vertiport (e.g., with multiple landing areas), or any other suitable items. In some embodiments, a reflector 120 with a certain predefined rotational rate can be associated with a certain location that is not a landing area, such as a waypoint, a hazard, or another navigational point of interest.

According to embodiments, characteristics of reflected radio energy signals detected by the radar system 106 can be used to determine which reflector 120 is producing the reflected radio energy. For example, reflected radio energy may be amplitude-modulated due to the rotation of the reflector 120. The rate (or frequency) of amplitude modulation is based on the rotational rate of the reflector 120. Accordingly, analysis (e.g., by an aircraft 105) of amplitude modulation can be used to determine a rotational rate, and the rotational rate can then be used to identify a certain reflector 120, and thereby to identify a certain associated landing area 110, airport or vertiport, and/or other location of interest.

Further, signal processing can be used to separate and identify two different reflected radio energy signals that are received simultaneously. Two corresponding reflectors can be identified and disambiguated based on information about the respective rotational rates of each reflector 120 and an analysis of the time-variation in the total received signal.

According to embodiments, the reflector's orientation and rotation can be controlled and calibrated, so that the reflector's orientation can be determined at any given time. For example, in some embodiments, the reflector 120 can be configured so that it is oriented toward a certain predetermined direction at a known time. In one example, and as shown in FIG. 1B, the reflector 120 can be controlled so that is it oriented to the North (e.g., magnetic North or true North) at the beginning of every time interval.

According to embodiments, each time interval at the reflector 120 can be defined by and synchronized with a timing signal maintained by the control system 123. The reflector's rotation rate and orientation can be phase-locked with the time interval as defined by the timing signal. With a combination of the timing signal, the reflector's rotational rate, and the reflector's pre-established orientation (e.g., North) of the reflector 120 at the time of each timing signal (e.g., the beginning of a time interval), the reflector's orientation at other times can be determined. An example of a reflector orientation as defined by a displacement-angle from its predefined initial orientation is shown by the angle Φ in FIG. 1B.

The amount of time to complete a full revolution is the inverse of the rotational rate. For example, if the rotational rate is 3 revolutions per second, than the time to complete one revolution is ⅓ seconds. Accordingly, if the predefined orientation at the beginning of a time interval is North, then the reflector 120 will be pointed North at 0 seconds (e.g., the beginning of the time interval and/or the moment of the timing signal), ⅔ seconds, ⁴⁄₆ seconds, and 1 second, and the reflector 120 will be pointed South at ⅙ seconds, ⅜ seconds, and ⅚ seconds.

According to embodiments, the aircraft 105 also has a timing signal, which may be maintained by the computer 107. The aircraft's timing signal may be synchronized (or phase-locked) with the reflector's timing signal. As a result, the aircraft 105 can determine the current orientation Φ of the reflector 120 based on the current time (e.g., relative to the timing signal), the reflector's predefined rotational rate (e.g., which may be provided to the aircraft 105 at an earlier time), and the pre-established orientation of the reflector 120 (e.g., which may be provided to the aircraft 105 at an earlier time) at the moment of each timing signal.

The timing signal can have any suitable frequency. For example, the timing signal can be a pulse-per-second signal (e.g., 1 Hz). The reflector's timing signal (e.g., maintained by the control system 123) and/or the aircraft's timing signal (e.g., maintained by the aircraft computer 107) can be generated either externally or by an included GPS receiver. In some embodiments, the reflector 120 and aircraft 105 can both align their internal timing signals with an external GPS timing signal (also referred to as a GPS second). By synchronizing with a universal GPS timing signal, the reflector 120 and aircraft 105 internal timing signals can become synchronized (also referred to as aligned or phase-locked) with each other. GPS timing information is accurate to tens of nanoseconds.

Additionally, when a GPS receiver is incorporated at the reflector 120 and/or the aircraft 105, a GPS-disciplined oscillator can be used to continue precise timing in case the GPS signal is disrupted. Internal timing signal electronics (e.g., an internal clock) that are initially calibrated by a GPS timing signal, such as a GPS-disciplined oscillator, may provide a sufficiently accurate timing signal even when the external GPS-provided timing signal is no longer available. GPS timing information can be carried over after a GPS disruption for many hours without significant loss of accuracy.

As mentioned above, the control system 123 may operate the motor 122 to drive the reflector 120 rotation with a fixed, selected rotational velocity. This rotational velocity can be selected as a fixed integral number of revolutions per second (e.g. 4 rps). The control system 123 may operate the motor 122 to rotate the reflector 120 so that the phase of the reflector's rotation is synchronized (e.g., phase-locked) to the timing signal input. For example, at the beginning of a GPS second (e.g., at the moment of each timing signal), the reflector 120 can have a predetermined initial orientation (e.g., due North). The predetermined initial orientation can refer to the initial azimuth direction of the reflector's maximum reflectivity or the initial direction of the boresight angle. Different ground installations and reflectors may use different known rotation rates. Various circuits or their digital equivalents, including phase-locked loops and delay-locked loops, can implement these constraints.

In some embodiments, information about the reflector 120 such as a location and rotational characteristics (e.g., rotational rate, rotational direction, rotational axis, and the initial orientation) can be published and/or otherwise known by the aircraft 105.

Reflector Identification

Figure 2:
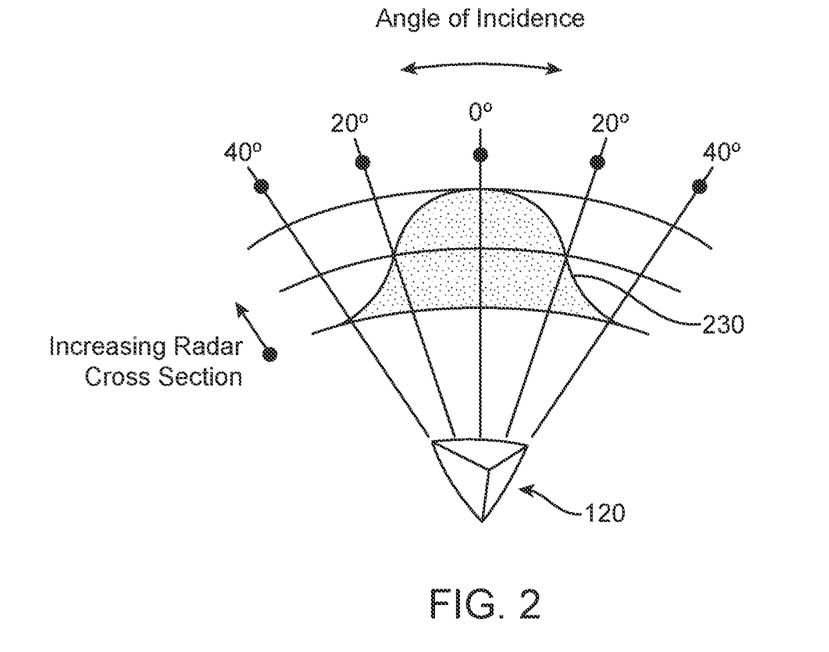
FIG. 2 demonstrates example reflective properties of a reflector, according to embodiments.

FIG. 2 demonstrates example reflective properties of a reflector 120, according to some embodiments. The extent to which an object reflects radio energy back toward the source is referred to as a radar cross section or reflectivity. As shown in FIG. 2, the reflector 120 may have a greater radar cross section when radio energy arrives at smaller angles of incidence relative to the boresight angle (e.g., 0-5 degrees). The greatest amount of radio energy reflection can occur at the boresight angle (e.g., 0 degrees). The reflector 120 may more weakly reflect at larger angles of incidence, but still reflect a measurable amount of radio energy up to a certain angle of incidence, such as 40 degrees, 45 degrees, 50 degrees, or 90 degrees (e.g., depending upon the shape and configuration of the reflector 120.

Referring back to FIGS. 1A-1B, and as mentioned above, the radar system 106 at the aircraft 105 may transmit radio energy. The radar system 106 may transmit the radio energy continuously or iteratively (e.g., in regular bursts). The radar system 106 may transmit the radio energy in all directions, in multiple directions, or in a single direction. Additionally, the radar system 106 may modulate the radio energy so that the radio energy spans back and forth across a predefined spectrum or range.

The transmitted radio energy may arrive at the reflector 120. The reflector 120 may reflect some of the radio energy back toward the radar system 106 at the aircraft 105. The amount of reflected radio energy may vary based on the orientation of the reflector 120. As mentioned above, the reflector 120 may reflect a higher amount of radio energy when oriented directly toward the radar system 106, may reflect a lesser amount when oriented slightly toward (e.g., within 90 degrees of) the radar system 106, and may not reflect any radio energy when oriented away from (e.g., more than 90 degrees) the radar system 106. The reflector 120 at the landing area 110 may continuously rotate, as discussed above. Thus, the amount of radio energy reflected back toward the radar system 106 may change with time, as the reflector 120 rotates.

As a result, the radar system 106 may receive a reflected radio energy signal from the reflector 120 that is amplitude-modulated (e.g., the signal strength varies with time). The received signal may be non-continuous, regularly repeating, and/or oscillating in amplitude.

The radar system 106 can compare the timing and characteristics of this received amplitude-modulated signal with known information about one or more reflectors. For example, the radar system 106 can determine that the received signal has a carrier frequency in the radio energy range, and has certain rate of amplitude modulation (also referred to as amplitude modulation frequency). The amplitude modulation rate can be determined based on the amount of time between occurrences of detecting the signal (e.g., the time between signal pulses), the amount time between peak amplitudes (e.g., peak reflectivity) of the signal, or any other suitable signal analysis. For example, it may be determined that the amplitude modulation rate is 1 Hz.

The amplitude modulation rate can correspond to the rotational rate of the reflector 120 that is producing the amplitude-modulated signal (e.g., via time-varying reflection toward the radar system 106). Accordingly, the radar system 106 can determine that the received signal is being produced by a reflector 120 that rotates at a rotational rate that is the same as the determined amplitude modulation rate. For example, a reflector 120 with a rotational rate of 1 Hz.

The radar system 106 may have information about a plurality of reflectors, their respective rotational rates, and/or their respective locations (e.g., landing areas). The information can be stored in a plurality of reflector records corresponding to the plurality of reflectors. Accordingly, the radar system 106 can identify a specific reflector 120 and/or location that is associated with the determined rotational rate (e.g., 1 Hz).

According to embodiments, analysis of the reflected signal and identification of the reflector 120 and/or location can be performed by the radar system 106 (e.g., a first processor at the radar system) or a separate aircraft computer 107 (e.g., a second processor).

Embodiments can also include an additional way to distinguish between different reflectors 120 and their associated locations (e.g., different landing areas). For example, instead of, or in addition to, using specific rotation rate characteristics to distinguish between reflectors 120 and associated locations, each reflector 120 may be configured to reflect radio energy of a specific frequency, or within a specific narrow frequency band. For example, an optical coating can be applied to the reflector 120 so that it reflects a certain desired frequency or range of frequencies. As a result, different reflectors 120 (e.g., at different locations) can be configured to reflect different specific frequencies of radio energy, thereby characterizing the location of certain reflected signals received at the aircraft 105. The size of the reflector 120 can be created to suit a given wavelength.

Bearing Measurement

As discussed above, in embodiments, the radar system 106 can identify a reflector 120 and/or reflector-associated location based on the amplitude-modulation rate (also referred to as the amplitude-modulation frequency) of a received radio energy signal. Further, the received amplitude-modulated signal can be compared with a timing signal and rotational characteristics of the identified reflector 120 to determine a bearing of the aircraft 105 relative to the reflector 120 and/or associated location (e.g., the landing area 110).

For example, the radar system 106 can provide the amplitude-modulated signal to the aircraft computer 107. The aircraft computer 107 can then use the signal to determine the time when the reflector 120 is oriented directly at the aircraft 105. For example, the peak of the amplitude-modulated signal (e.g., peak reflectivity) can occur when the reflector 120 is oriented directly at the aircraft 105 and radar system 106. Accordingly, the aircraft computer 107 can locate the peak of the amplitude-modulated signal, and then identify the time at which that peak occurs.

Embodiments allow any suitable type of signal analysis to be used to determine when the reflector 120 is oriented directly at the aircraft 105. For example, instead of or in addition to using the peak of the amplitude-modulated signal, the aircraft computer 107 can determine a beginning and end of a signal pulse (e.g., which the signal pulse is first and last detected), identify the associated time interval, and use the middle of the time interval.

The aircraft computer 107 can then compare the time when the reflector 120 is oriented directly at the aircraft 105 to the timing signal (e.g., which may be synchronized between the aircraft 105 and the reflector 120) to determine a time difference. The time difference can be used, in conjunction with rotation characteristics of the reflector 120 (e.g., the initial orientation and/or rotation rate), to determine the orientation of the reflector 120 at the moment when it is pointed toward the aircraft 105. For example, the time difference can be used to determine the reflector's progress through a rotational interval at the time when the reflector 120 is pointed at the aircraft 105. The reflector's progress and angle-orientation relative to the predefined starting point is shown by the angle Φ in FIG. 1B.

For example, as discussed above, the reflector 120 can be configured so that it is initially oriented toward a certain predetermined direction at each timing signal. In one example, and as shown in FIG. 1B, the reflector 120 can be controlled so that is it oriented to the North (e.g., magnetic North or true North) at the moment of each timing signal. The reflector 120 can be phase-locked with the timing signal, so that its rotational progress (e.g., a percentage of completion) through a revolution is tied to the time since the previous timing signal.

The aircraft computer 107 can store information about the reflector 120. Accordingly, the aircraft computer 107 can have a record indicating that the reflector 120 has a predetermined initial orientation such that it is pointed in a certain direction (e.g., North) at each timing signal, and/or that the reflector 120 rotates at a certain rotational rate (e.g., 1 Hz) in a certain rotational direction (e.g., clockwise as viewed from above).

As an example, the time difference may be ⅓ seconds. If the reflector 120 rotational rate is 1 Hz, then ⅓ seconds corresponds to ⅓ of a revolution (or 120 degrees of rotation). Given a rotational direction of clockwise starting from North, ⅓ of a revolution means rotating to 120 degrees from North (which can also be described as 60 degrees from South, or approximately East-Southeast).

The aircraft computer 107 can thereby determine or calculate the orientation (e.g., compass direction) of the reflector 120 when it is pointed directly toward the aircraft 105. This can be referred to as the bearing of the aircraft 105 relative to the reflector 120, from the perspective of the reflector 120. The opposite of that direction (e.g., add 180 degrees) provides the bearing of the reflector 120 relative to the aircraft 105, from the perspective of the aircraft 105. For example, the if the determined orientation of the reflector 120 at the peak pulse signal is 120 degrees (e.g., from North in the clockwise direction), the bearing of the reflector 120 relative to the aircraft 105 is 300 degrees (e.g., from North in the clockwise direction).

According to embodiments, the aircraft computer 107 can use the determined bearing for navigation. For example, the reflector 120 may be located at landing area 110 that is the intended destination. In such a case, the aircraft computer 107 can operate the aircraft 105 so that it moves toward the reflector 120 in the direction of the determined bearing (e.g., 300 degrees from North in the clockwise direction). The aircraft computer 107 may use an onboard compass and steer the aircraft 105 so that is oriented in the correct direction according to the compass.

According to embodiments, the aircraft computer 107 can use the determined bearing for navigation even the reflector 120 and landing area 110 are not the intended destination. The aircraft computer 107 can still obtain information about the location of the aircraft 105 that is useful for navigation toward other destinations. For example, the aircraft computer 107 can use the determined bearing and stored information about the location of the reflector 120 and/or associated landing area 110 to determine and/or verify the current location of the aircraft 105. The known location of the reflector 120, the bearing of the reflector 120 relative to the aircraft 105, and the distance of the reflector 120 relative to the aircraft 105 (e.g., which may be simultaneously determined using radar techniques described above) can provide a precise current location (e.g., coordinates) of the aircraft 105 in space.

According to embodiments, analysis of the reflected signal and determination of the bearing can be performed by the aircraft computer 107 or by the radar system 106 (e.g., a computer processor of the radar system).

Figure 3:
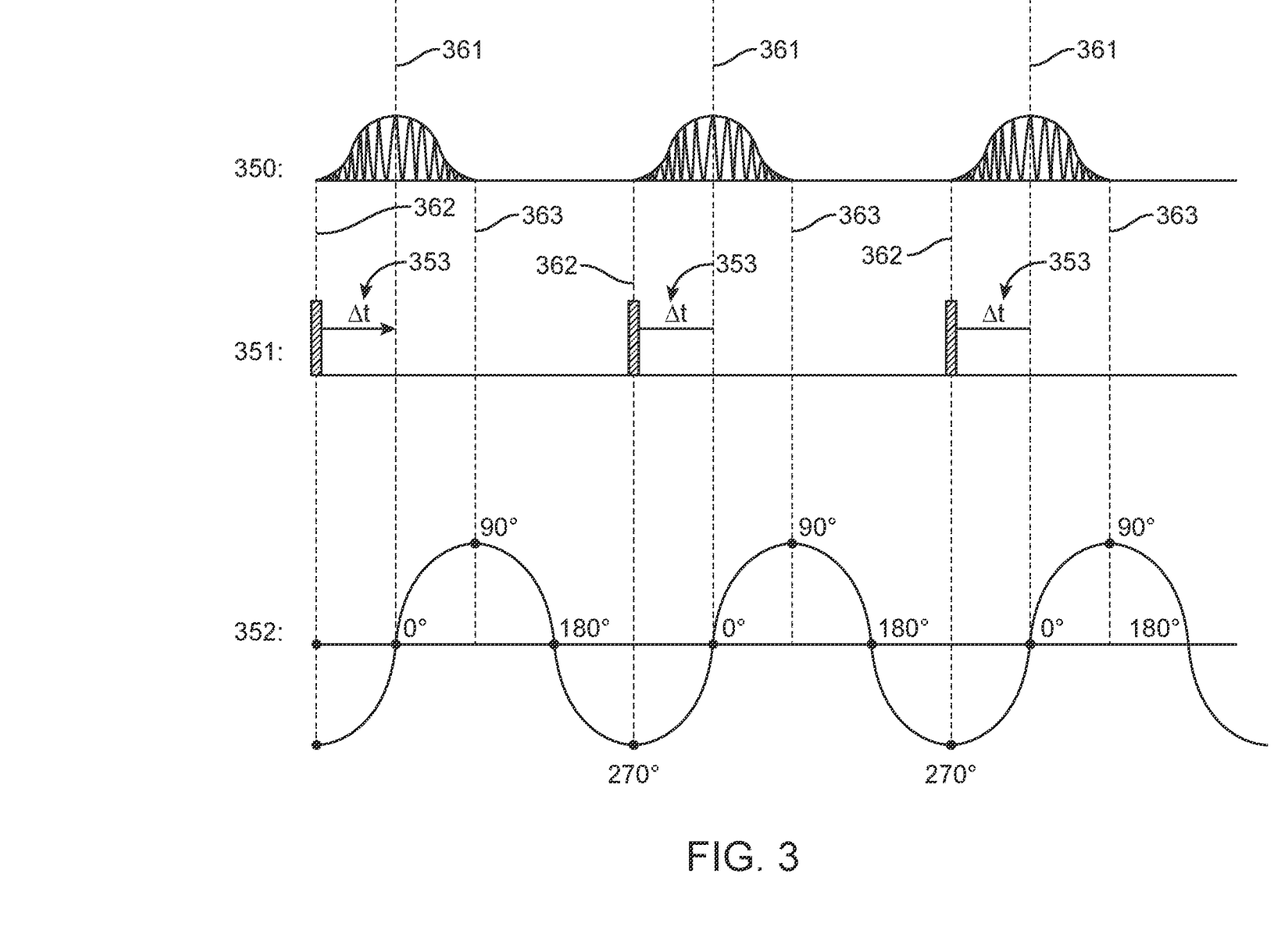
FIG. 3. illustrates example of a reflected radio energy, according to various embodiments.

FIG. 3. illustrates example of a reflected radio energy signal that is used to calculate a bearing. The illustration depicts, as functions of time, a received signal 350, a timing signal 351, and a reflector orientation 352.

A received signal 350 represents radio energy that is received by the radar system 106 after having been reflected by the reflector 120. As shown, the received signal 350 can vary over time in amplitude or intensity, which can be due to the time-varying orientation of the reflector 120 and resulting time-variation in the amount of radio energy that is reflected back to the radar system 106. Additionally, the received signal 350 may arrive in pulses, or otherwise periodically disappear, which can happen when the reflector 120 faces away from the radar system 106.

The timing signal 351, as discussed above, can be a regularly repeating pulse. The aircraft computer 107 can maintain an internal timing signal, which can be synchronized with a reflector 120 timing signal, and which can be calibrated to match a GPS-provided timing signal. Two pulses of the timing signal 351 are shown in FIG. 3.

The reflector orientation 352 illustrates the angle of the direction that the reflector 120 is facing as a function of time. In this illustration, the angle of the reflector 120 is measured with respect to the location of the aircraft 105 (e.g., in a horizontal plane). By this definition, the reflector 120 faces directly toward the aircraft 105, the angle is 0 degrees. When the reflector 120 faces away from the aircraft 105, the angle is 180 degrees. As shown by the reflector orientation 352, the reflector 120 can rotate at a continuous rotational rate.

The illustrations of the received signal 350 and the reflector orientation 352 both relate to the same time axis. Dotted lines are used to show certain points in time 361, 362, and 363 that are of interest. For example, at the point in time 361, the reflector orientation 352 is 0 degrees (e.g., which in this example can represent the reflector oriented directly at the aircraft 105), and the received signal 350 has a maximum amplitude. The received signal 350 increases as the reflector orientation 352 approaches the 0 degree orientation, and the received signal 350 decreases down to zero as the reflector orientation 352 angle increases. The point in time 362 shows when the received signal 350 is first detected (e.g., for a given pulse), and it corresponds to when the angle between the reflector 120 and the aircraft 105 decreases across a certain threshold angle. Similarly, the point in time 363 shows when the received signal 350 is no longer detected (e.g., for a given pulse), and it corresponds to when the angle between the reflector 120 and the aircraft 105 increases across a certain threshold angle. The threshold angle can be a result of characteristics of the reflector 120. In this example, the threshold angle is 90 degrees in either direction (e.g., 90 degrees or 270 degrees). In other embodiments, the threshold angle can be 40 degrees, 45 degrees, 50 degrees, or any suitable angle relative to the boresight angle of the reflector 120.

According to various embodiments, the aircraft computer 107 can store a reflector record with information about the reflector 120, such as its rotation rate, its rotation direction, its location (e.g., a corresponding landing area 110), and/or the reflector's initial orientation at each timing signal pulse. For example, the aircraft computer 107 may store information indicating that the reflector 120 is initially oriented toward the North at each timing signal pulse. This information, in conjunction with the received signal 350 and the common timing signal 351 can be used to calculate the aircraft 105 bearing relative to the reflector 120.

For example, the aircraft computer 107 can compare the received signal 350 to the timing signal 351. The aircraft computer 107 can determine a time difference 353 between the timing signal 351 and the time 361 when the received signal 350 has a maximum amplitude. The aircraft computer 107 can then use this time difference 353 in conjunction with the rotation rate to determine the orientation of the reflector 120 at the time 361.

In this example illustrated in FIG. 3, the time difference 353 is ¼ seconds (e.g., assuming a 1-second time interval between each timing signal pulse). This time difference 353 can be compared with a total time interval (e.g., 1 second) to determine a percentage of time interval completion (e.g., ¼ complete). As shown, in this example, the reflector 120 completes one revolution per timing signal 351 pulse. Thus, given the time difference 353 that is ¼ of the time interval between timing signal 351 pulses, the reflector 120 has completed ¼ of a rotation at the time 361. Therefore, if the reflector 120 begins each revolution pointed North and rotates clockwise, then the reflector 120 is pointed 90 degrees (e.g., ¼ of a rotation) from North at time 361.

As discussed above, this calculated or otherwise determined orientation of the reflector 120 is the bearing 130 of the aircraft 105 relative to the reflector 120. The bearing 130 of the reflector 120 relative to the aircraft 105 is the opposite orientation (e.g., 270 degrees from North).

As mentioned, the aircraft computer 107 can use the determined bearing for navigation. For example, the reflector 120 may be located at landing area 110 that is the intended destination. In such a case, the aircraft computer 107 can operate the aircraft 105 so that it moves toward the reflector 120 in the direction of the determined bearing.

As mentioned above, embodiments allow the reflector 120 to rotate about any suitable axis. A reflector 120 rotating about the vertical axis can allow the aircraft 105 to determine a bearing in longitude and/or latitude coordinates. Alternatively, a reflector 120 rotating about a horizontal axis may instead allow the aircraft 105 to determine information about a vertical (e.g., downward) angle between the aircraft 105 and the landing area 110. This vertical bearing angle can be used to determine how steeply the aircraft 105 may need to descend to arrive at the altitude and location of the landing area 110.

Cone Navigation

Figure 4:
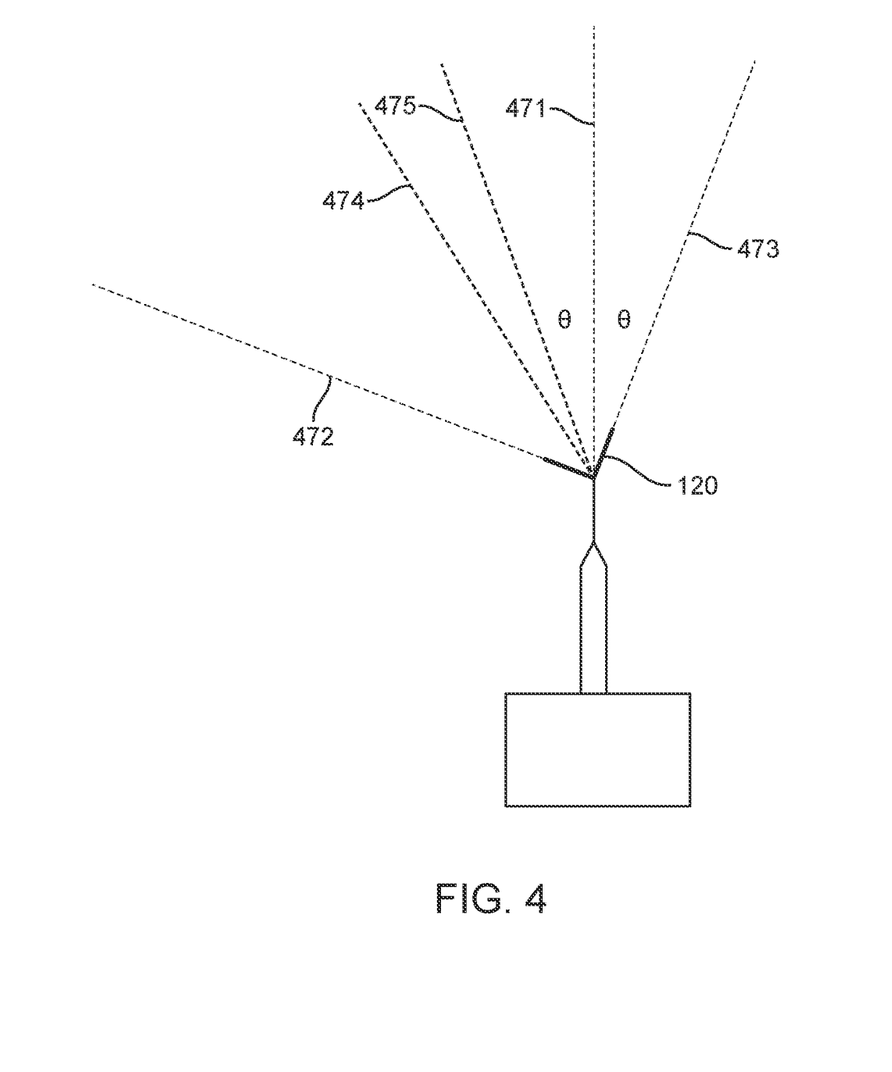
FIG. 4. illustrates example of using a reflector with a tilted disposition, according to various embodiments.

According to some embodiments, the reflector 120 may always reflect radio energy back towards objects that are above the reflector 120. Such as when the aircraft 105 is directly above the reflector 120, or substantially above the reflector (e.g., the majority of the displacement from reflector location to aircraft location is vertical and not horizontal). As an example, the reflector 120 may always reflect radio energy back towards objects that are located in a vertical cone extending from the reflector 120. The vertical cone can be defined by an outer shell that encircles a vertical line (e.g., plumb line) and that is separated from the vertical line by a predefined angle (e.g., 1 degree, 3, degrees, 5 degrees, 10 degrees, 15 degrees, etc.).

The size of the vertical cone can be the result of characteristics of the reflector 120. For example, the reflector 120 may be configured so that it rotates about the vertical axis, and in a tilted positioned. An example of a tilted disposition is shown in FIG. 4. In the illustration, the reflector 120 rotates about the vertical line 471, the boresight angle (e.g., maximum reflection) is shown by the boresight line 474, and the reflector 120 reflects radio energy back to radio energy emitting objects if the objects are located within edge lines 472 and 473.

As shown, due to this tilting, the reflector 120 may reflect radio energy not just from objects in the horizontal direction (e.g., sharing a similar longitude and latitude as the boresight line 474), but also from objects directly above (e.g., on the vertical line 471). Further, the reflector 120 may reflect radio energy from objects above and slightly behind, between the vertical line 471 and the edge line 473. The predefined angle between the vertical line 471 and the edge line 473 can 1 degree, 3, degrees, 5 degrees, 10 degrees, 15 degrees, or any other suitable angle.

The space between the vertical line 471 and the edge line 473 can create the vertical cone above the reflector 120. As the reflector 120 rotates, the edge line 473 sweeps around the vertical line 471 to define the cone. This is illustrated by the line 475, which represents where the line 473 will be when the reflector rotates 180 degrees. The line 475 is equally distanced from the vertical line 471 as the edge line 473, but in the opposite direction.

Accordingly, in embodiments, if the aircraft 105 is within a certain vertical cone above the reflector 120 (e.g., between lines 473 and 475), the aircraft 105 may receive reflected radio energy from the reflector 120 at all times, regardless of the current orientation of the reflector 120. The radio energy signal strength may still vary within the vertical cone due reflectivity variations the $3^{rd}$ dimension (not illustrated in FIG. 4).

The vertical cone can provide additional positional information that can be used for navigation. For example, when the aircraft 105 is below the line 472, this is referred to as outside the cone. Outside the cone, no information is available about the reflector 120. Between the line 472 and the line 475 can be referred to as an outer cone. When the aircraft 105 is located in the outer cone, the reflector 120 will periodically reflect radio energy back to the aircraft 105 (e.g., as described above due to reflector rotation). In the outer cone, the aircraft 105 can gain bearing information for navigation, as discussed above. Between the line 475 and the line 473 can be referred to as the vertical cone or the inner cone. When the aircraft 105 is located in the vertical cone, the reflector 120 will continuously reflect radio energy back to the aircraft 105, even while rotating. As a result of the continuous reflection instead of the periodic reflection, the aircraft 105 can may no longer be able to determine a bearing or bearing resolution may otherwise decrease. However, the aircraft 105 may be able to determine that, by virtue of the continuous reflection signal, the aircraft 105 is located directly or substantially above the reflector 120.

In one example, the aircraft computer 107 can use GPS systems to initially navigate the aircraft 105 toward the landing area 110 at an altitude that will intersect the outer cone. Once within the outer cone, the aircraft computer 107 can determine bearing information and use it to fly toward the vertical cone. Then, once inside the vertical cone (or inner cone), the aircraft computer 107 can cause the aircraft 105 to descend vertically toward the reflector 120 and landing area 110. For example, if the reflector 120 is in the center of the landing area 110, the aircraft may land in a position that is centered on top of the reflector 120. During descent, if the aircraft 105 leaves the vertical cone and re-enters the outer cone (e.g., as evidenced by the return of strong direction-indicating signal of the outer cone), the aircraft computer 107 can once again to determine a bearing and use it to maneuver so that the aircraft 105 moves back into and/or stays within the vertical cone.

Signal Isolation

In some embodiments, multiple reflectors 120 may be within reflective range of the radar system 106 on the aircraft 105. For example, there may be more than one reflector 120 at an airport and/or landing area 110. Also, there may be one or more reflectors 120 at other locations that are also within reflective range of the aircraft 105 and radar system 106. As a result, the radar system 106 may receive one or more reflected signals simultaneously. From a total received signal, the radar system 106 may separate and isolate different amplitude-modulated signals that correspond to different rotation rates. This can be done using one or more signal processors.

Figure 5:
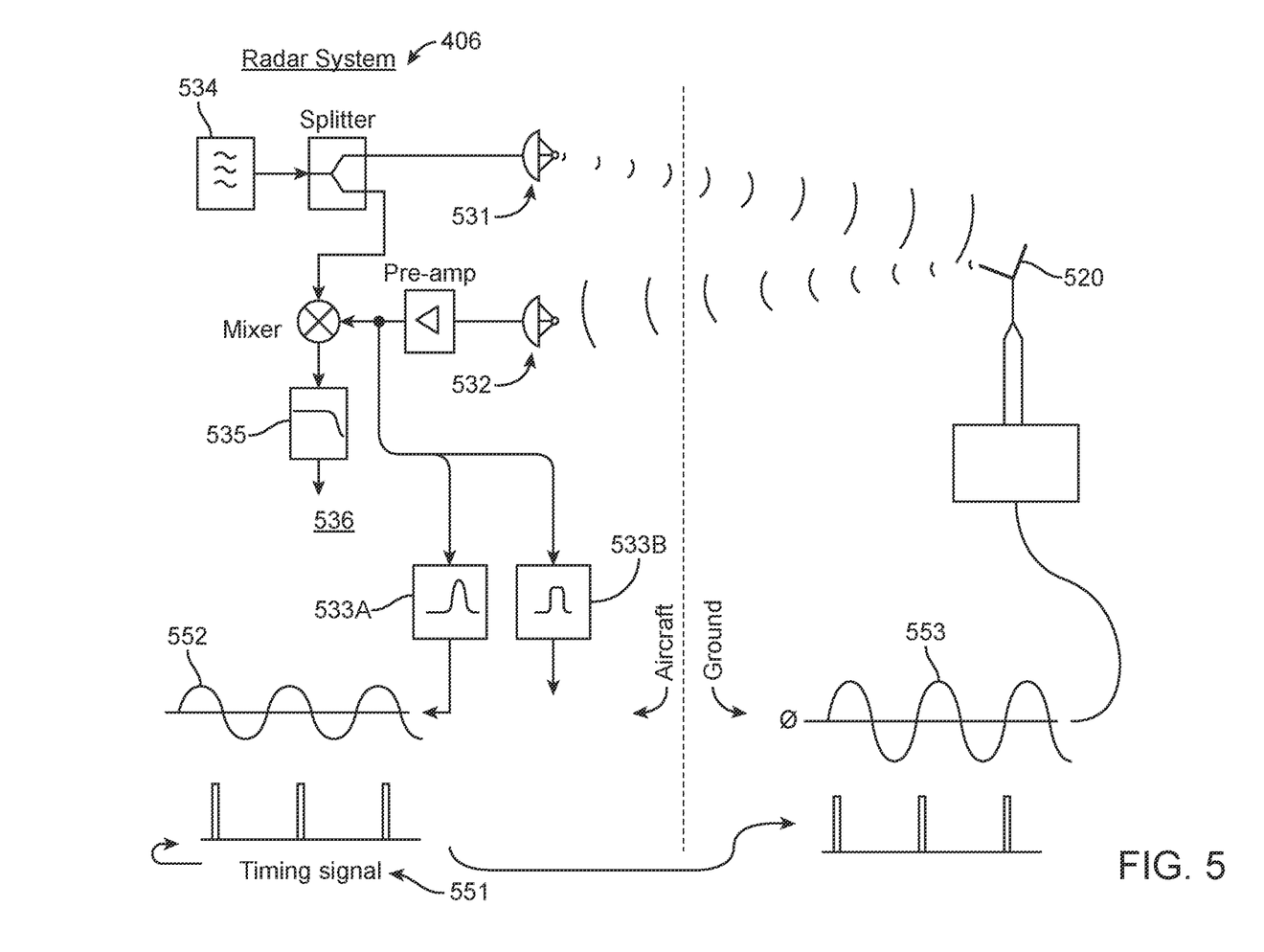
FIG. 5 illustrates an example of a radar system with a signal processor including one or more electronic circuitry components for extracting signals based on amplitude-modulation frequency, according to various embodiments.

An example of a radar system with a signal processor including one or more electronic circuitry components for extracting a signal of a specific amplitude-modulation frequency (e.g., due to a reflector rotation rate) is shown in FIG. 5. A transmission antenna 531 transmits radio energy away from the radar system 506 and the aircraft. The transmission can include multiple radio energies (e.g., as provided by an RF generator 534). In some embodiments the transmission sweeps across a range of energies, such between 5.1 and 5.3 GHz.

A reflector 520 can reflect the radio energy back to the reflector 520. The reflected radio energy can be amplitude-modulated based on a changing orientation (e.g., due to rotation) of the reflector 520 relative to the radar system 506. The rate of modulation (also referred to as a modulation frequency) can be directly based on the reflector's rotation rate. The changing reflector orientation 553 is shown as phase-locked with the timing signal 551. The reflected radio energy can then be detected by the receiving antenna 532 at the radar system 506. When detected, the receiving antenna 532 can convert the radio energy (a form of electromagnetic radiation) into an alternating electrical current within the antenna 532 and circuitry of the radar system 506.

As mentioned above, other reflectors may reflect radio energy (e.g., with different modulation frequencies), and multiple reflected radio energy signals may arrive at the receiving antenna 532 simultaneously. Accordingly, the radar system 506 may extract specific frequencies of amplitude-modulation from within a total received signal.

For example, in some embodiments, the radar system 506 may include one or more bandpass filters, such as a first bandpass filter 533A and a second bandpass filter 533B. Each bandpass filter can be tuned to a certain frequency or frequency band, so that only a certain frequency (or frequency band) of amplitude-modulations can pass through to the circuitry on the other side of that given filter. Embodiments allow a bandpass filter 533A to be tuned to an amplitude-modulation frequency corresponding to a specific reflector 520. The total received signal can be passed through one or more of these bandpass filters, thereby isolating specific amplitude-modulation frequencies corresponding to desired and/or known reflectors 506.

Having isolated a specific amplitude-modulated radio energy reflection signal, the radar system 506 (or a separate aircraft computer) can determine which reflector 520 produced that signal, based on known information about different reflectors. Also, the phase of the signal can be compared to the timing signal 551 to determine a bearing, as described above.

Additionally, in some embodiments, other circuitry can be used to determine the distance from the radar system 506 to the reflector 520. For example, a low pass filter 535 can be used to determine a radio frequency phase shift between the outgoing signal emitted by the transmission antenna 531 and the incoming signal received by the receiving antenna 532. The radio frequency phase shift can then be used to determine the total signal travel time, and then travel time can be used to determine the distance 536 between the radar system 506 to the reflector 520.

Further, embodiments can incorporate this signal travel time information when calculating the time difference between the timing signal and reflected signal discussed above, thereby improving the calculating of the aircraft's bearing relative to the reflector 520.

Position Measurement

Embodiments allow an aircraft to use two or more reflected signals from two or more reflectors, in combination, to provide additional information beyond a bearing of an aircraft 105. For example, two reflected signals from reflectors in different places can allow the aircraft to calculate a first bearing of the aircraft relative to the first reflector in a first area, and a second bearing of the aircraft relative to the second reflector in the second area. These two bearings, along with known positions of the two reflectors, can be used to triangulate the position (e.g., latitude and longitude coordinates) of the aircraft. Incorporating additional bearings relative to additional reflectors can improve the calculation.

In some embodiments, various reflectors may be located in different locations, but at similar altitudes (e.g., all on or near the ground). A lack of vertical diversity among the reflectors can limit the aircraft's ability to determine a vertical location (e.g., altitude) of the aircraft from the combination of calculated bearings. However, the aircraft may still be able to determine its altitude by using the original function of a radar altimeter (e.g., bouncing radio signals off of the ground), and therefore the aircraft may not need altitude data from the combination of bearings.

Additionally, as mentioned above, one or more reflectors can be configured to rotate about any suitable axis. While a typical bearing is an angle within a horizontal plane parallel to the ground, a reflector that rotates about a horizontal axis may provide a vertical bearing that is an angle within a vertical plane perpendicular to the ground. A combination of such vertical bearings can be used to triangulate more information about an aircraft altitude.

Method

Figure 6:
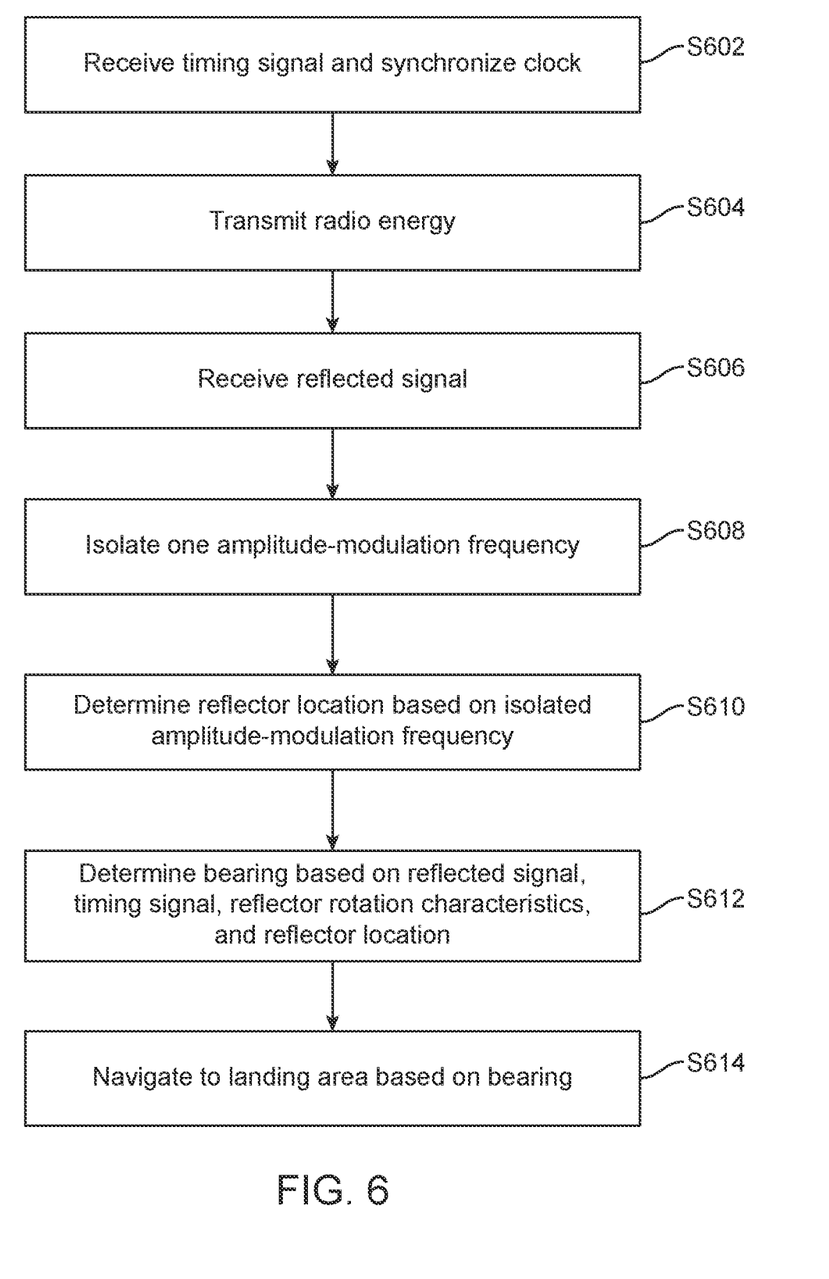
FIG. 6 illustrates an example flowchart of steps performed by an aircraft navigation system, according to various embodiments.

FIG. 6 illustrates a flowchart of steps performed by an exemplary aircraft navigation system. While the steps refer to an aircraft, one or more steps may be performed by a radar system, a separate aircraft computer (e.g., of a flight control system), and/or a combination of both.

At step S602, an aircraft (e.g., via a radar system or aircraft computer) can receive a universal timing signal, such as a GPS timing signal pulse. An onboard internal clock can be synchronized with the universal timing signal. Additionally, timers of one or more reflector assemblies located at one or more landing areas can also receive the universal timing signal and synchronize their respective internal clocks with the universal timing signal.

At step S604, the aircraft (e.g., via a radar system or aircraft computer) can transmit radio energy (e.g., a band of energies or a specific energy). In some embodiments, a continuous transmission can scan repeatedly over a range of energies (also referred to as radio frequencies).

One or more reflectors can reflect the radio energy back to the aircraft. The reflectors may rotate continuously. Due to their rotation, the strength of the reflection will vary. As a result, the radio energy can be an amplitude-modulated signal when reflected. The reflectors may be in known locations, and may rotate in a known manner (e.g., clockwise at one-revolution per timing pulse, initially oriented North at the moment of each time pulse). Each reflector may rotate at a different rate, or have other varying characteristics.

At step S606, the aircraft (e.g., via a radar system or aircraft computer) can receive a reflected signal. The reflected signal may include one or more reflected signals from one or more reflectors. Each contributing signal may have a different amplitude-modulation frequency (e.g., even if the carrier frequency is the same).

At step S608, the aircraft (e.g., via a radar system or aircraft computer) can isolate one reflector signals from the total received reflected signal. For example, one or more bandpass filters can identify a signal with a specific amplitude-modulation frequency.

At step S610, the aircraft (e.g., via a radar system or aircraft computer) can determine which reflector caused the reflected signal based on the isolated amplitude-modulation frequency. For example, a first reflector located at a first landing area may be configured to amplitude-modulate the radio energy with the first frequency (e.g., due to a corresponding rotation rate). The aircraft can use the amplitude-modulation frequency to identify a first reflector record corresponding to a first reflector from among a plurality of reflector records corresponding to a plurality of reflectors. The aircraft can then obtain information from the first reflector record associated with the first reflector, such as a location and rotation characteristics (e.g., rotational rate, initial orientation, rotational direction, etc.).

At step S612, the aircraft (e.g., via a radar system or aircraft computer) can determine a bearing of the aircraft relative to the determined reflector. For example, the location of the determined reflector, the timing signal, characteristics of the received reflected signal (e.g., the time of the peak amplitude), and information about the reflector rotation (e.g., rotation rate, initial orientation at each timing signal, rotation direction) can be used to determine a bearing of the aircraft relative to the reflector.

In some embodiments, the aircraft can determine additional bearings relative to additional reflectors at additional locations based on additional received radio energy reflections. Further, additional bearings can be used together to triangulate or otherwise determine positional coordinates of the aircraft. Other radar techniques can be used to determine distance from each reflecting object, as well as altitude relative to the ground below.

At step S612, the aircraft (e.g., via a radar system or aircraft computer) can navigate to a landing area and/or perform a vertical landing based on the determined bearing and/or position information. Embodiments allow the aircraft to continuously operate and repeat the method during a landing process in order to continually update the bearing/location data for continuing navigation. Further, the aircraft may analyze the received signal to determine when it is within a vertical cone, and may descend vertically within the vertical cone.

In some embodiments, steps S602-S608 can be performed by an onboard radar system, and steps S610-S612 can be performed by one or more separate aircraft computer systems.

Embodiments of the invention advantageously enable an aircraft to determine precise bearing and/or coordinates without relying on irregular and potentially inaccurate GPS systems. By introducing rotating reflectors at landing areas and other suitable locations, a localized navigation system can be introduced. Shared timing information between the reflectors and aircraft can enable the aircraft to navigate based on periodically-reflected signals (which may be amplitude-modulated) from the reflectors. Further, embodiments introduce this new functionality efficiently by utilizing existing radar altimeters for this additional function. As a result, embodiments may not require adding new hardware to aircraft that are already outfitted with radar altimeters, thereby providing a solution without adding weight to the aircraft. Also, rotating reflectors can be included at landing areas without being intrusive or obstructive.

In contrast with Very high frequency Omnidirectional Range (VOR) systems that use ground-based beacons to actively transmit radio signals (i.e., active radar), embodiments allow the use of reflectors that reflect signals but do not generate and transmit their own signals (i.e., passive radar). This improves efficiency, reduces costs, and can simplify ground-based systems.

While the invention has been described with reference to specific embodiments, those skilled in the art with access to this disclosure will appreciate that variations and modifications are possible.

It should be understood that all numerical values used herein are for purposes of illustration and may be varied. In some instances, ranges are specified to provide a sense of scale, but numerical values outside a disclosed range are not precluded.

It should also be understood that all diagrams herein are intended as schematic. Unless specifically indicated otherwise, the drawings are not intended to imply any particular physical arrangement of the elements shown therein, or that all elements shown are necessary. Those skilled in the art with access to this disclosure will understand that elements shown in drawings or otherwise described in this disclosure may be modified or omitted and that other elements not shown or described may be added.

The above description is illustrative and is not restrictive. Many variations of the invention will become apparent to those skilled in the art upon review of the disclosure. The scope of patent protection should, therefore, be determined not with reference to the above description, but instead should be determined with reference to the following claims along with their full scope or equivalents.

What is claimed is:

1. A system comprising:
an aircraft; and
navigation equipment coupled to the aircraft, the navigation equipment including:
an antenna assembly configured to transmit radio energy and detect radio energy; and
one or more processors configured to:
receive, from the antenna assembly, a reflected radio energy signal that was reflected by a reflector and detected by the antenna assembly, wherein the reflected radio energy signal is amplitude-modulated due to the reflector rotating at a predetermined rotational rate;
determine an amplitude-modulation frequency of the reflected radio energy signal, the amplitude-modulation frequency corresponding to the predetermined rotational rate;
identify, based on the amplitude-modulation frequency, a reflector record associated with the reflector from among a plurality of reflector records corresponding to a plurality of reflectors, the reflector record including information about a predetermined location of the reflector; and
navigate using the predetermined location.

2. The system of claim 1, wherein the antenna assembly includes a first antenna configured to transmit radio energy and a second antenna configured to detect radio energy.

3. The system of claim 2, wherein the first antenna is located at a first position on the aircraft, and wherein the second antenna is located at a second position on the aircraft.

4. The system of claim 1, wherein the antenna assembly includes one antenna configured to alternate between transmitting radio energy and detecting radio energy.

5. The system of claim 1, wherein the one or more processors includes at least a first processor and a second processor, the first processor being included in a radar system, and the second processor being included in a flight control system.

6. The system of claim 1, further comprising:
a ground installation positioned at the predetermined location, the ground installation including;
the reflector, where the reflector is configured to reflect radio energy;
a motor coupled to the reflector, wherein the motor is configured to rotate the reflector; and
a control system coupled to the motor and configured to operate the motor so that the reflector rotates at the predetermined rotational rate.

7. The system of claim 6, wherein the control system is further configured to maintain a first timing signal, and to operate the motor so that rotation of the reflector is phase-locked with the first timing signal, and wherein the one or more processors are further configured to:
maintain a second timing signal, the second timing signal being synchronized with the first timing signal;
determine, based on the second timing signal and the reflected radio energy signal, a bearing of the aircraft relative to the predetermined location; and
navigate using the bearing of the aircraft relative to the predetermined location.

8. The system of claim 7, wherein the control system is further configured to operate the motor so that the reflector has a predetermined initial orientation at each instance of the first timing signal, and wherein determine the bearing of the aircraft relative to the predetermined location includes:
determine a time difference between the second timing signal and a peak amplitude of the reflected radio energy signal; and
calculate the bearing of the aircraft relative to the predetermined location based on the time difference, the predetermined rotational rate, and the predetermined initial orientation.

9. The system of claim 8, wherein the predetermined initial orientation is toward North.

10. The system of claim 7, wherein the reflector is configured to rotate about a vertical axis, and wherein the bearing includes a direction in longitude and latitude coordinates.

11. The system of claim 7, wherein the reflector is configured to rotate about a horizontal axis, and wherein the bearing includes angle within a vertical plane.

12. The system of claim 7, wherein the one or more processors are further configured to:
receive a GPS timing signal;
synchronize the second timing signal with the GPS timing signal; and wherein the control system is further configured to:
receive the GPS timing signal; and
synchronize the first timing signal with the GPS timing signal.

13. The system of claim 7, wherein the first timing signal and the second timing signal both have a frequency of 1 Hz, and wherein the predetermined rotational rate is one two, three, four, or five revolutions per second.

14. The system of claim 6, wherein the predetermined location is an aircraft landing area, and wherein the reflector is located in the center of the aircraft landing area or adjacent the aircraft landing area.

15. The system of claim 6, wherein the ground installation is a first ground installation, the predetermined location is a first predetermined location, the predetermined rotational rate is a first predetermined rotational rate, and wherein the system further comprises:
a second ground installation positioned at a second predetermined location that is different from the first predetermined location, the second ground installation including;
a second reflector, where the second reflector is configured to reflect radio energy;
a second motor coupled to the second reflector, wherein the second motor is configured to cause the second reflector to rotate; and
a second control system coupled to the second motor and configured to operate the second motor so that the second reflector rotates at a second predetermined rotational rate that is different from the first predetermined rotational rate.

16. A method comprising:
transmitting, by an aircraft, radio energy;
receiving, by the aircraft, a reflected radio energy signal that was reflected by a reflector, wherein the reflected radio energy signal is amplitude-modulated due to the reflector rotating at a predetermined rotational rate;

determining, by the aircraft, an amplitude-modulation frequency of the reflected radio energy signal, the amplitude-modulation frequency corresponding to the predetermined rotational rate;

identifying, by the aircraft, based on the amplitude-modulation frequency, a reflector record associated with the reflector from among a plurality of reflector records corresponding to a plurality of reflectors, the reflector record including information about a predetermined location of the reflector; and navigating, by the aircraft, using the predetermined location.

17. The method of claim 16, further comprising:
maintaining a timing signal;

determining, based on the timing signal and the reflected radio energy signal, a bearing of the aircraft relative to the predetermined location; and navigating using the bearing of the aircraft relative to the predetermined location.

18. The method of claim 17, wherein the reflector record includes information about a predetermined initial orientation of the reflector at each instance of the timing signal, and wherein determining the bearing of the aircraft relative to the predetermined location includes:

determining a time difference between the timing signal and a peak amplitude of the reflected radio energy signal; and calculating the bearing of the aircraft relative to the predetermined location based on the time difference, the predetermined rotational rate, and the predetermined initial orientation.

19. The method of claim 17, wherein the predetermined location is an aircraft landing area, and wherein navigating using the bearing of the aircraft relative to the predetermined location includes navigating toward the aircraft landing area.

20. The method of claim 17, wherein the reflected radio energy signal is a first reflected radio energy signal, the reflector is a first reflector, the predetermined rotational rate is a first predetermined rotational rate, the amplitude-modulation frequency is a first amplitude-modulation frequency, the reflector record is a first reflector record, the predetermined location is a first predetermined location, the bearing is a first bearing, and wherein the method further comprises:

receiving, by the aircraft, a second reflected radio energy signal that was reflected by a second reflector, wherein the second reflected radio energy signal is amplitude-modulated due to the second reflector rotating at a second predetermined rotational rate;

determining, by the aircraft, a second amplitude-modulation frequency of the second reflected radio energy signal, the second amplitude-modulation frequency corresponding to the second predetermined rotational rate;

identifying, by the aircraft, based on the second amplitude-modulation frequency, a second reflector record associated with the second reflector from among the plurality of reflector records, the second reflector record including information about a second predetermined location of the second reflector;

determining, based on the timing signal and the second reflected radio energy signal, a second bearing of the aircraft relative to the second predetermined location;

determining a position of the aircraft based on the first bearing, the second bearing, the first predetermined location, and the second predetermined location; and navigate using the position.

* * * * *